(12) United States Patent
Brewer et al.

(10) Patent No.: US 8,695,926 B2
(45) Date of Patent: Apr. 15, 2014

(54) ACTIVE GURNEY FLAP

(75) Inventors: Paul R. Brewer, Keynsham (GB);
Steven Shorcott, Thrupp Stroud (GB);
Reg R. Raval, Yatton (GB)

(73) Assignee: Claverham Ltd., Bristol (GB)

( * ) Notice: Subject to any disclaimer, the term of this patent is extended or adjusted under 35 U.S.C. 154(b) by 71 days.

(21) Appl. No.: 13/449,909

(22) Filed: Apr. 18, 2012

(65) Prior Publication Data
US 2012/0261519 A1    Oct. 18, 2012

(30) Foreign Application Priority Data

Apr. 18, 2011    (EP) ..................................... 11250479

(51) Int. Cl.
*B64C 3/50* (2006.01)
(52) U.S. Cl.
USPC ....................................................... 244/215
(58) Field of Classification Search
USPC .............. 244/215, 17.13, 201, 211, 216, 217,
244/212, 203, 76 R, 198, 199.4, 99.14,
244/99.13; 416/241 R, 90 R, 223 R; 29/428,
29/889.1, 889.7
See application file for complete search history.

(56) References Cited

U.S. PATENT DOCUMENTS

| | | | | |
|---|---|---|---|---|
| RE19,412 E | * | 1/1935 | Zaparka | 244/215 |
| 5,294,080 A | * | 3/1994 | Ross | 244/215 |
| 5,388,788 A | * | 2/1995 | Rudolph | 244/215 |
| 5,492,448 A | * | 2/1996 | Perry et al. | 416/62 |
| 5,518,210 A | | 5/1996 | Friberg | |
| 6,010,307 A | * | 1/2000 | McCabe | 416/237 |
| 6,030,179 A | * | 2/2000 | McCabe | 416/237 |
| 6,039,533 A | * | 3/2000 | McCabe | 415/146 |
| 6,132,181 A | * | 10/2000 | McCabe | 417/334 |
| 6,474,945 B1 | * | 11/2002 | Nakasato et al. | 416/23 |
| 6,565,045 B1 | * | 5/2003 | Correge et al. | 244/215 |
| 6,843,452 B1 | * | 1/2005 | Vassberg et al. | 244/203 |
| 6,863,245 B2 | | 3/2005 | Gessler et al. | |
| 7,410,133 B2 | * | 8/2008 | Lee et al. | 244/215 |
| 7,610,841 B2 | * | 11/2009 | Padan | 89/1.815 |
| 7,740,205 B1 | | 6/2010 | Nahas | |
| 7,740,206 B2 | | 6/2010 | Eaton et al. | |

(Continued)

FOREIGN PATENT DOCUMENTS

| | | |
|---|---|---|
| DE | 911309 U1 | 1/1992 |
| DE | 102006036389 A1 | 4/2008 |

(Continued)

OTHER PUBLICATIONS

Extended European Search Report for EP11250479 mailed on Aug. 3, 2011.

(Continued)

*Primary Examiner* — Christopher P Ellis
*Assistant Examiner* — Medhat Badawi
(74) *Attorney, Agent, or Firm* — Carlson, Gaskey & Olds, P.C.

(57) ABSTRACT

A gurney flap assembly has an actuator, a flexible or hinged body, the body flexing from a retracted to a deployed position in reaction to motion of the actuator, and a first seal extending along a first edge of the flexible body that flexes from the stowed position. Linear motion of the actuator output is transposed to the gurney flap thereby moving it from a retracted position into the airstream. This trailing edge device will improve airfoil lift.

19 Claims, 4 Drawing Sheets

(56) References Cited

U.S. PATENT DOCUMENTS

| | | | |
|---|---|---|---|
| 2003/0102410 A1* | 6/2003 | Gessler et al. ............... | 244/215 |
| 2003/0218102 A1* | 11/2003 | Van Dam et al. ............. | 244/215 |
| 2005/0242234 A1* | 11/2005 | Mahmulyin ................. | 244/75.1 |
| 2007/0221789 A1 | 9/2007 | Lee et al. | |
| 2009/0123224 A1* | 5/2009 | Dazet ........................... | 403/143 |
| 2009/0263252 A1 | 10/2009 | Slot | |
| 2009/0302167 A1* | 12/2009 | Desroche ................... | 244/199.4 |
| 2009/0321582 A1* | 12/2009 | Eaton et al. ................. | 244/215 |
| 2010/0164249 A1* | 7/2010 | Nusbaum ................... | 296/180.4 |
| 2010/0209258 A1 | 8/2010 | Fuglsang et al. | |
| 2010/0278657 A1 | 11/2010 | Kildegaard | |
| 2011/0164976 A1* | 7/2011 | Matalanis et al. ............ | 416/1 |
| 2011/0168835 A1* | 7/2011 | Oliver ......................... | 244/12.4 |
| 2011/0210883 A1* | 9/2011 | Mohamadi ................... | 342/21 |
| 2011/0272532 A1* | 11/2011 | Matsuda ....................... | 244/215 |
| 2012/0193183 A1* | 8/2012 | Gunter et al. ................. | 192/48.1 |
| 2012/0195764 A1* | 8/2012 | Fuglsang et al. ............ | 416/223 R |
| 2012/0292945 A1* | 11/2012 | Nusbaum ................... | 296/180.4 |

FOREIGN PATENT DOCUMENTS

| | | |
|---|---|---|
| EP | 0939029 A2 | 9/1999 |
| EP | 1085152 A2 | 3/2001 |
| EP | 1488998 A1 | 12/2004 |
| EP | 2316732 A2 | 5/2011 |
| FR | 2792285 A1 | 10/2000 |

OTHER PUBLICATIONS

Extended European Search Report for EP1125041 mailed Sep. 21, 2011.

Extended European Search Report for EP11250480 on Sep. 21, 2011.

US Patent Application Title: "Active Gurney Flap", U.S. Appl. No. 13/449,617, filed Apr. 18, 2012.

US Patent Application Title: "Active Gurney Flap", U.S. Appl. No. 13/449,749, filed Apr. 18, 2012.

* cited by examiner

ACTIVE GURNEY FLAP

CROSS-REFERENCE TO RELATED APPLICATION

This application claims priority to European Application No. 11250479.0, filed Apr. 18, 2011.

BACKGROUND

This application relates to Gurney flaps and more particularly to active Gurney flaps.

A Gurney flap is a small flat tab projecting from a trailing edge area of a wing. Typically the Gurney flap is set at a right angle to the pressure side surface of the airfoil, and projects up to 2% of the wing chord. The chord wise position is typically 0.9 chord to the extreme trailing edge when measured from the leading edge. This trailing edge device will improve airfoil lift.

The Gurney flap operates by increasing pressure on the pressure side of the wing that increase the lift force and may be used in auto racing, helicopter rotors, horizontal stabilizers, and high drag aircraft that take advantage of the resultant lift force.

The Gurney flap typically increases the drag coefficient, especially at low angles of attack, although for thick airfoils, a reduction in drag is known. A net benefit in overall lift to drag ratio is possible if the flap is sized appropriately based on the boundary layer thickness. Also, the increased pressure on the lower surface ahead of the flap means the upper surface suction can be reduced while producing the same lift.

SUMMARY

According to an embodiment disclosed herein, a gurney flap assembly has an actuator, a flexible body the body flexing or hinged from a stowed to a deployed position in reaction to motion of the actuator, and a first seal extending along a first edge of the flexible body that flexes or hinges from the stowed position. This arrangement seals the cavity when the flap is deployed.

According to a still further embodiment disclosed herein, a gurney flap assembly for a rotary wing aircraft has a wing having a pressure side, a suction side, a trailing edge and a hollow portion between the pressure side and the suction side and adjacent the trailing edge of the wing, an actuator disposed within the hollow portion of the wing, and a flexible body attaching or hinged to the pressure side and to the actuator, the body having a downwardly depending flap for moving into and out of a retracted position into the airstream, and a first seal extending along a first edge of the flexible body.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
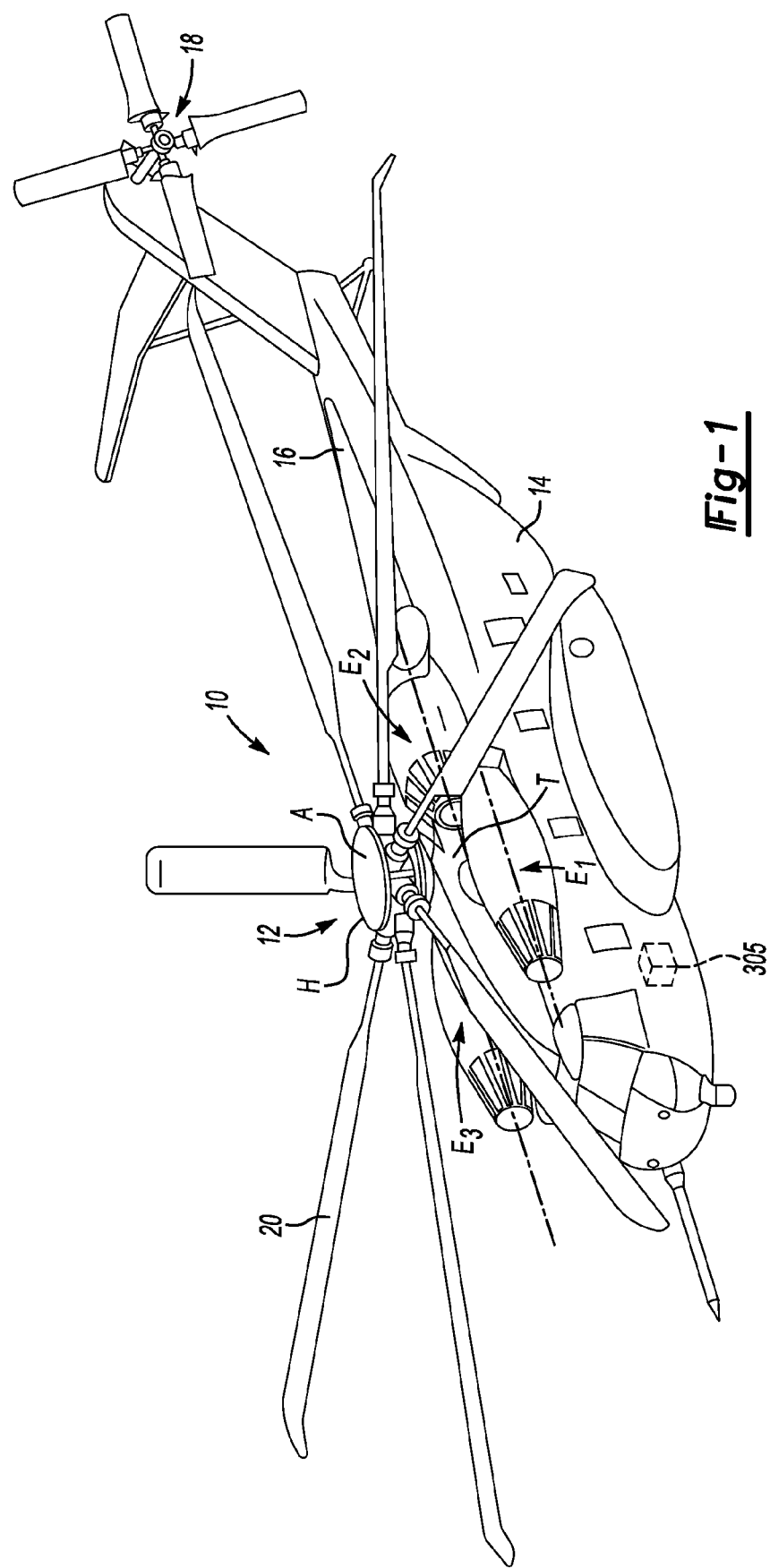
FIG. 1 shows a generic helicopter incorporating an embodiment described herein.

FIG. 1 schematically illustrates a generic rotary-wing aircraft 10 having a main rotor system 12. The aircraft 10 includes an airframe 14 having an extending tail 16 that mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub H.

Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, may also benefit from the present invention.

Figure 2:
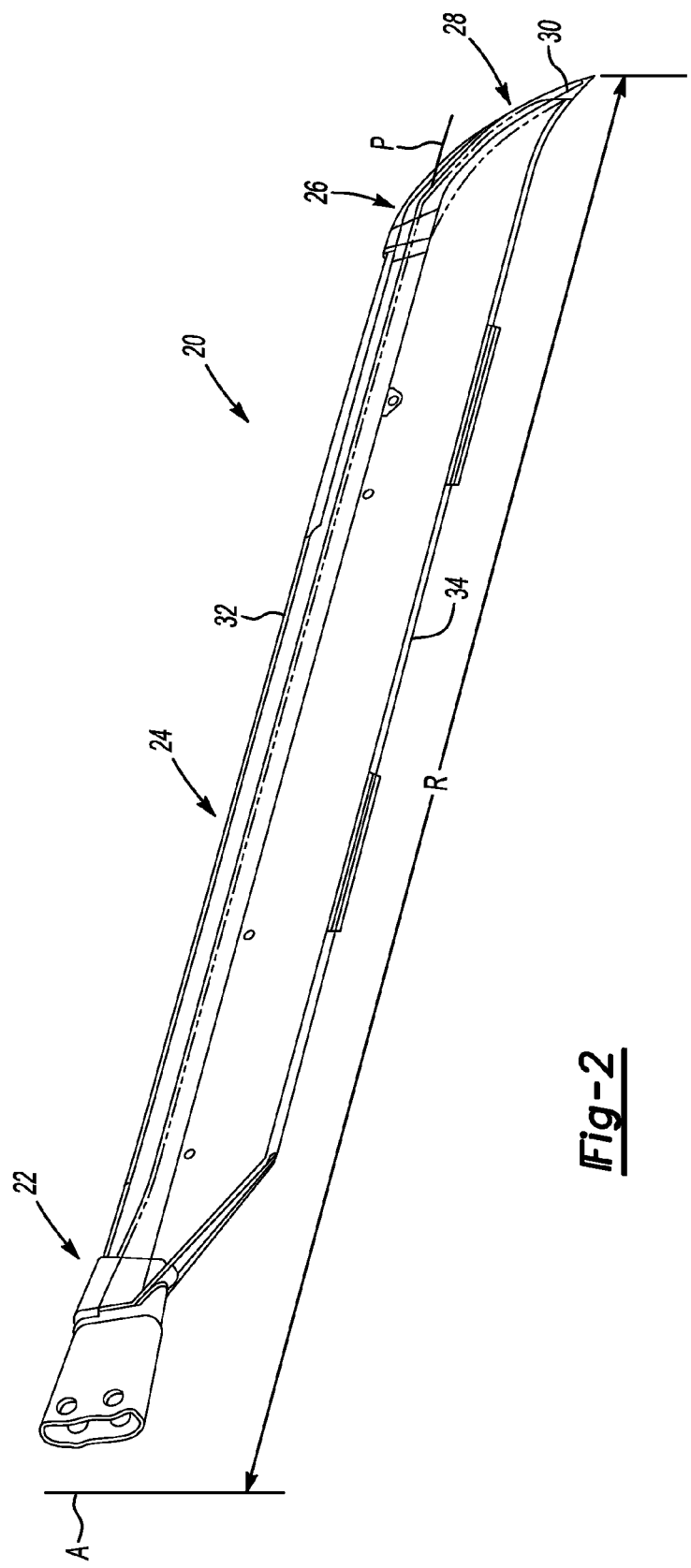
FIG. 2 shows a typical rotary wing of the helicopter.

Referring to FIG. 2, each rotor blade assembly 20 of the rotor assembly 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 may include an anhedral form though any angled and non-angled forms such as cathedral, gull, bent, and other non-straight forms will benefit from the present invention.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length C.

Figure 3:
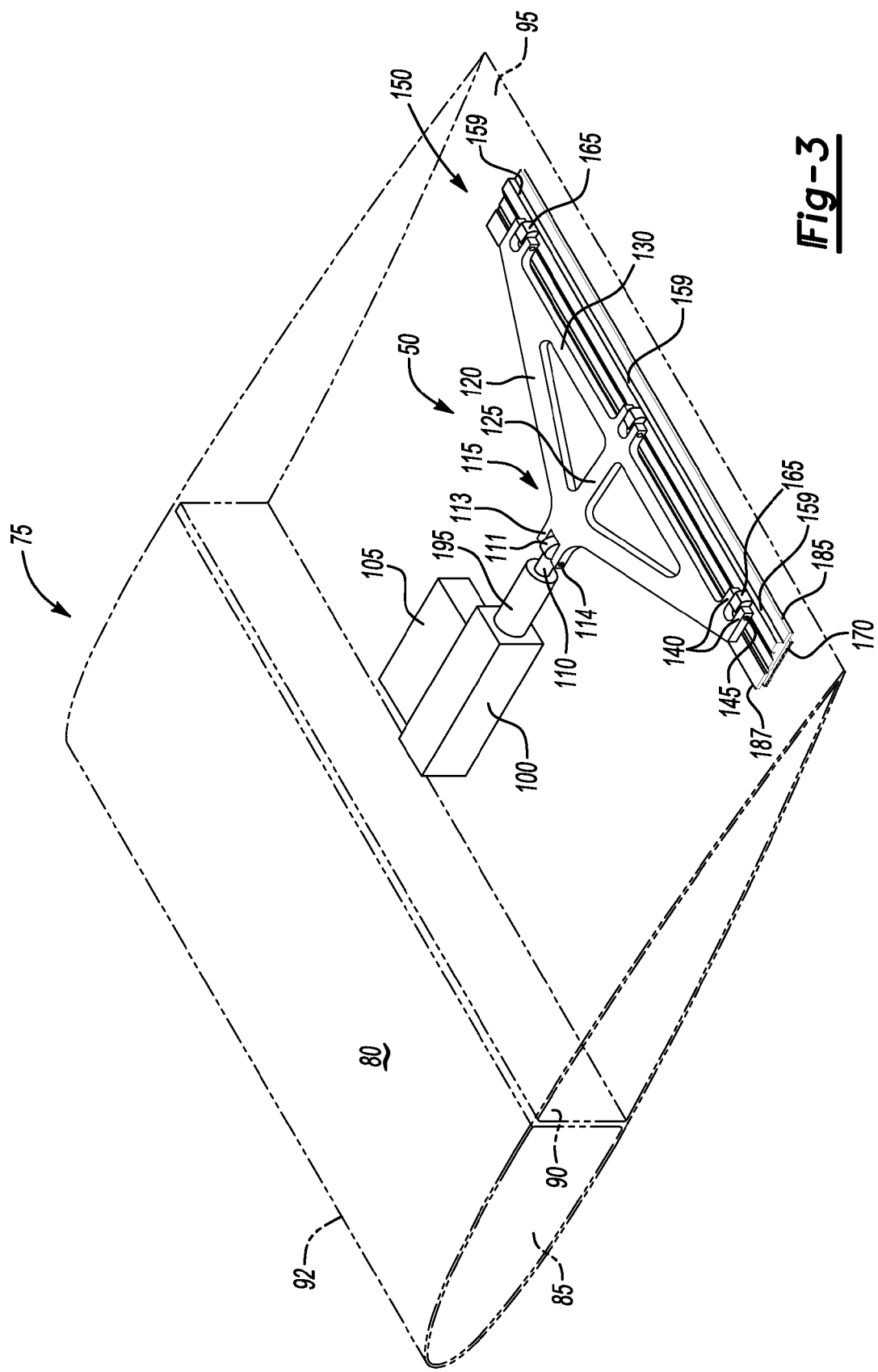
FIG. 3 shows a sectional view of the aircraft wing of FIG. 2 partially in phantom and the gurney flap assembly.
Figure 4:
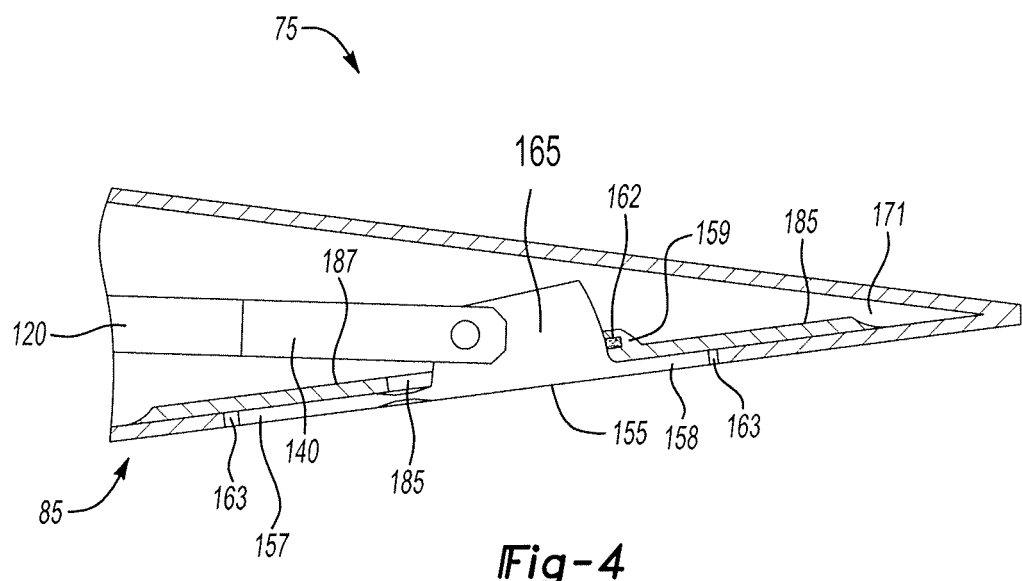
FIG. 4 shows a side view of FIG. 3 in a stowed position.
Figure 5:
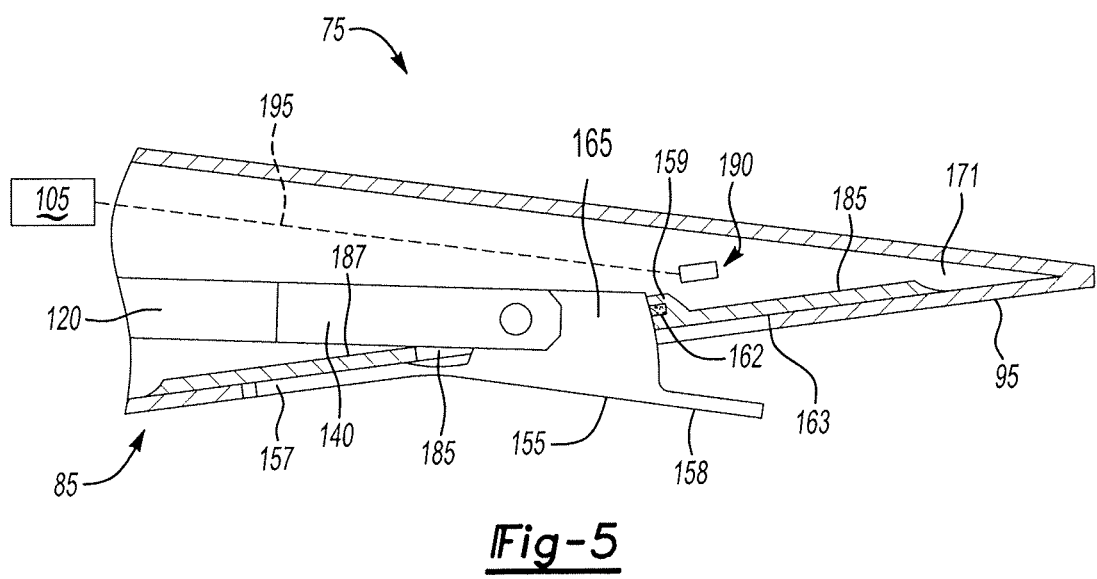
FIG. 5 shows a side view of FIG. 3 in a deployed position.

Referring now to FIGS. 3-5, a perspective view of a Gurney flap assembly 50 is shown. The helicopter wing 75 has a pressure side 85, a suction side 80, a support beam or spar 90, disposed between the pressure side 85 and the suction side 80, a leading edge 92 and a trailing edge 95.

The Gurney flap assembly 50 is disposed between the pressure side 85 and the suction side 80 aft of the support beam or spar 90 and has an actuator 100, a controller 105, an actuator output 110 that is reciprocated by the actuator 100. The controller 105 can be located in close proximity to the actuator 100 or located remotely from the actuator 100. The actuator output 110 has an eye end assembly 111 that fits within ears 113 of the yolk assembly 115 and is anchored thereto by a pin 114 that passes through the ears 113 and the eye end assembly 111. The actuator 100 can also be mounted in a span wise orientation by adding a suitable bell crank mechanism or the like.

The yolk assembly 115 has a pair of angled arms 120, a central support 125 that extends from the ears 113 through the angled arms 120 and attaches to a perpendicularly disposed bottom support 130. As shown in this embodiment, the bottom support 130 has three sets of bosses 140 through which a pin 145 grips three protrusions 165 of a Gurney flap 150.

The Gurney flap 150 has a flexible body 155 having a forward edge 157 that attaches to the pressure side 85 of the wing 75 and an aft portion 158 having an extending flange which forms the gurney flap when deployed. The flexible body 155 extends downwardly if urged by the actuator 100. The Gurney flap 150 is disposed in a rectangular cutout 163 of the wing pressure side 85. A brush seal 170, or the like, is disposed at either end of the flexible body 155 to minimize a passage of debris into a chamber 171 between the pressure side 85 and the suction side 80. Such debris might damage the actuator 100 or the controller 105 or the Gurney flap assembly 50. A flange 159 extends axially along a length of the cutout adjacent the trailing edge and has an axial groove in which a seal 162, such as a brush or an elastomeric material is disposed therein also to minimize an infusion of debris in the wing 75. As the aft portion 158 translates upwardly and downwardly, the upwardly extending flange 159 cooperates with the seal 162 to again minimize the infusion of debris into the wing 75.

A plate 185 extends beyond a length and a width of the cutout 163 and has a forward portion 187 extending into the cutout 163. The plate has an opening 185 through which the bosses 140 urge the body 155 to flex or hinge into the airstream under the action of the actuator. A forward portion 157 of the body 155 attaches to the forward portion 187 so that the forward portion 157 contacts and is flush with the pressure side 85 while stowed and deployed. The aft portion 158 of the body 155 contacts the plate 185 and is flush with the pressure side 85 while retracted.

Referring now to FIG. 4, a side view of the Gurney flap assembly of FIG. 3 is shown in a retracted position. In this position, the actuator output 110, such as a piston, is retracted thereby pulling the eye end assembly 111 forward thereby rotating the Gurney flap assembly 150 into the wing 75 such that the Gurney flap assembly 150 moves its aft portion 158 out of the air stream that travels along the pressure side 85 of the wing 75. The forward edge 157 of the flexible body 155 is attached to the inner surface of the pressure side 85 by adhesive or other appropriate means such as riveting or the like. While the actuator 100 moves the actuator output 110 linearly, the yoke assembly 115 translates this motion into a rotary motion of the flexible body about its attachment point. This rotary motion causes the aft portion 158 to move in and out of deployment.

Referring to FIG. 5, an activated position, the actuator 100 pushes the yolk assembly 115 aft thereby urging the legs 120 and the support 125 forward and downward to rotate the aft portion 158 into the air stream along the trailing edge 95 of the wing 75.

A position sensor 195 is placed around the actuator output 110 that informs the controller 105 as to the position of the aft portion 158 via the Gurney flap assembly 50. In addition, a second optional sensor 190, which communicates with the controller 105, is placed in close proximity (See FIG. 5) to the aft portion 158 of the Gurney flap 150. The second optional sensor 190 allows the controller to fine tune the position of the Gurney flap 150 should the wing 75 encounter excessive bending or other moments and the second sensor provides a degree of redundancy should it or the first sensor 195 fail. The first and second sensors 195, 190 in conjunction with the controller 105 permit the helicopter to rapidly modulate the position of the aft portion 158 to allow the helicopter wing 75 to provide a desired or even magnified mode of operation. For instance, if control is collective, a deployed aft portion 158 may allow a wing 75 to provide more lift relative to a wing without a deployed aft portion 158 and a retracted flap has no effect on the functionality of the wing 75. If control is cyclic, the actuator 100, at the behest of the controller 105, may modulate the aft portion 158 inwardly and outwardly at from a retracted position to a partial or full deployment to match the cyclic action required of the wings and may even magnify the action of the wing 75 by providing more lift if the aft portion 158 is deployed. The actuator 105 is designed to provide sinusoidal operation at partially or full stowing/deployment with steady holding states between movements.

The controller may compare signals from the first sensor 195 and the second sensor 190 to test whether the aft portion 158 is actually in a desired position and may reset the yoke assembly 150 to place the aft portion 158 in a desired position. Similarly, a second controller 305 in the aircraft 10 may compare the output of controller 105 with the expected performance of the wing 75 or the aircraft 10 and direct the controller 105 to position the yoke assembly 115 to position the aft portion 158 so that wing 75 performance is met. The actuator 105 is designed to provide sinusoidal operation or full stowing/deployment with steady holding states between movements.

The flexible body 155 and the aft portion 158 are made out of a flexible material hinged body such as a thin metal or a composite or the like. The aft portion 158 stiffness may be enhanced by the addition of local reinforcing. The thin metal or other composite is freely bendable or hinged to allow the actuator to move the Gurney flap without producing distortions or undulations into the surface of the wing. This active trailing edge will increase the blade lift force maximizing the effectiveness of the rotor blade, wings or spoilers. The device can be used in helicopter rotor blade primary control and Higher Harmonic Control (HHC) applications. Multiple gurney flap assemblies can be incorporated into the blade span to provide redundancy.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gurney flap assembly, said flap assembly comprising:
   an actuator,
   a flexible body, said flexible body configured to flex from a stowed position flush with a pressure side of a wing to a deployed position in reaction to motion of said actuator, and
   a first seal extending along a first edge of said flexible body that flexes to and from said stowed position.

2. The assembly of claim 1 further comprising:
   a second seal extending along a second edge of said flexible body that flexes from a stowed position.

3. The assembly of claim 2 wherein said first seal and said second seal are perpendicular to each other.

4. The assembly of claim 1 wherein said flexible body has a leading edge and a trailing edge and wherein said trailing edge is in close proximity to said first seal along a length of said first seal.

5. The assembly of claim 1 further comprising a yoke connecting said actuator to said flexible body.

6. The assembly of claim 5 wherein said yoke comprises a pair of arms and a support connecting said arms, said support attaching to said flexible body.

7. The assembly of claim 6 wherein said actuator attaches to said yoke by means of a rotatable connection.

8. The assembly of claim 1 wherein said flexible body may be in a partially deployed position.

9. The assembly of claim 1 further comprising:
   a mounting plate to which a first portion of said flexible body is attached and which touches a second portion of said flexible body if in a retracted position and which does not touch said second portion if in a deployed position.

10. A gurney flap assembly for a rotary wing aircraft comprising:
a wing having a pressure side, a suction side, a trailing edge and a hollow portion between said pressure side and said suction side and adjacent said trailing edge of said wing,
an actuator disposed within said hollow portion of said wing, and
a flexible body attaching to said pressure side and to said actuator, said body having a downwardly depending flap for moving to and from a retracted position at said pressure side, said flexible body is spaced from a trailing edge of the wing, and
a first seal extending along a first edge of said flexible body that flexes from a stowed position.

11. The assembly of claim 10 further comprising:
a second seal extending along a second edge of said flexible body that flexes from a stowed position and is mounted chord wise.

12. The assembly of claim 11 wherein said second seal is mounted within said hollow portion adjacent said second edge.

13. The assembly of claim 10 wherein said first seal is mounted within said hollow portion adjacent said first edge and is mounted span wise.

14. The assembly of claim 10 wherein said first seal and said second seal are perpendicular to each other.

15. The assembly of claim 10 wherein said flexible body has a leading edge and a trailing edge and wherein said trailing edge is in close proximity to said first seal along a length of said first seal.

16. The assembly of claim 10 further comprising:
a cutout in said wing in which said flexible or body and said first seal is disposed.

17. The assembly of claim 10 further comprising:
a mounting plate attaching to an interior at a leading edge and a trailing edge of said cutout to which a first portion of said flexible body is attached and which touches a second portion of said flexible body if in a stowed position and which does not touch said second portion if in a deployed position.

18. The assembly of claim 17 wherein said mounting plate extends into the cutout at said leading edge.

19. The assembly of claim 7 wherein said flexible member includes at least one protrusion for engaging the actuator.

* * * * *